United States Patent [19]

Kesler

[11] 3,718,030
[45] Feb. 27, 1973

[54] METHOD AND APPARATUS FOR ANALYSIS OF FLUID SUSPENSIONS

[75] Inventor: Richard B. Kesler, Appleton, Wis.

[73] Assignee: The Institute Of Paper Chemistry, Appleton, Wis.

[22] Filed: Sept. 28, 1970

[21] Appl. No.: 75,967

[52] U.S. Cl..................73/61 R, 73/73, 162/198, 162/263
[51] Int. Cl................................G01n 5/00
[58] Field of Search...73/61 R, 32, 149, 73; 162/198, 162/263

[56] References Cited

UNITED STATES PATENTS

| 2,691,298 | 10/1954 | Cook | 73/61 R |
|---|---|---|---|
| 2,463,159 | 3/1949 | Dietert | 73/32 |
| 2,907,203 | 10/1959 | Langmead | 73/73 |
| 3,487,682 | 1/1970 | Whitehead, Jr. | 73/149 |

OTHER PUBLICATIONS

Croup, A. H., et al. Consistency Tests & Packing Characteristics of Pulps. Paper Trade Journal, p. 217-223, Oct. 23, 1941.

Primary Examiner—Louis R. Prince
Assistant Examiner—Joseph W. Roskos
Attorney—Anderson, Luedeka, Fitch, Even and Tabin

[57] ABSTRACT

A method and apparatus are described for determining the weight of a moisture-free, compressible material in a given volume of fluid suspension. The given volume of the suspension is confined and the material in the confined suspension is compressed with a movable porous surface at a predetermined pressure to form a mat of the material. The thickness of the mat thus formed is measured and the weight of the material is determined therefrom from a known relationship. The apparatus may be flushed out by movement of a lower non-porous piston which retracts to open an outlet from the chamber.

1 Claim, 1 Drawing Figure

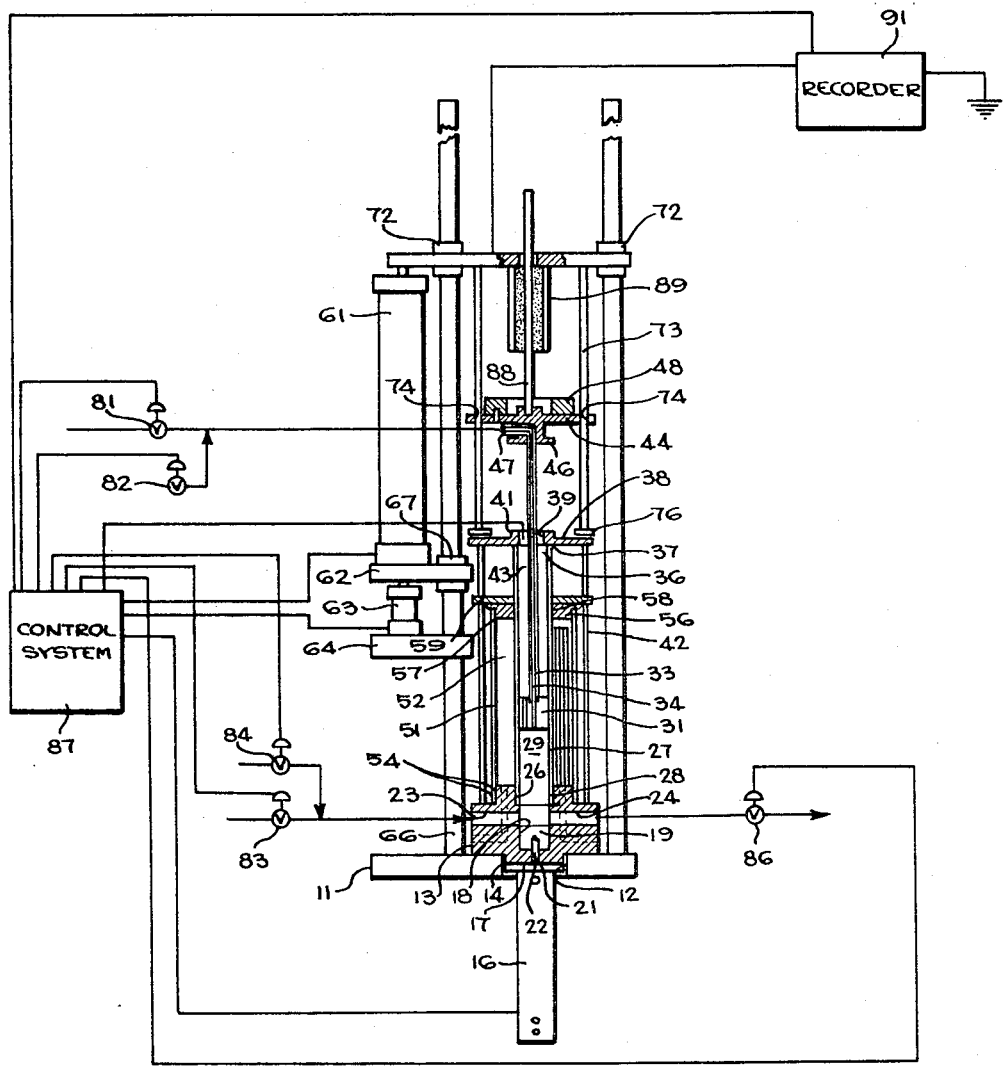

METHOD AND APPARATUS FOR ANALYSIS OF FLUID SUSPENSIONS

This invention relates generally to the analysis of fluid suspension and, more particularly, to an improved method and apparatus for determining the weight of a moisture-free, compressible material a given a given volume of fluid suspension. The invention has particular applicability to the art of paper making, but is not limited thereto.

In the manufacture of certain products, such as paper, it is of advantage to provide instrumentation for monitoring various physical properties of a slurry or suspension while it is being processed. For example, in paper making it is important to monitor the so-called consistency or dry fiber content of the pulp suspension being processed. Consistency or dry fiber content are defined by usage in the pulp and paper industry as the weight of dry fiber per unit volume of aqueous suspension or slurry, and such terms are commonly expressed in percentage terms. In addition to the consistency, it may be desirable to obtain small amounts of solid materials from the suspension for the purpose of performing chemical tests on such materials.

In many manufacturing operations using fluid suspensions of compressible fibrous materials, measurement of the consistency has frequently necessitated a periodic manual sampling and laboratory analysis of each sample. Although providing the necessary data with high accuracy, manual sampling is undesirable because it is time consuming and does not lend itself readily to automatic servo-system process control. Moreover, manual sampling is unsuited to the automation of chemical tests on solid materials in liquid suspension for purposes of process control.

Accordingly, it is an object of the present invention to provide a method and apparatus for automatically determining the weight of a moisture-free, compressible material in a given volume of fluid suspension.

Another object of the invention is to provide a method and apparatus for automatically obtaining and measuring accurately a desired amount of solid from a fluid suspension for performing tests thereon.

It is another object of the invention to provide a method and apparatus for automatically monitoring the consistency of aqueous suspensions or slurries.

A further object of the present invention is to provide a method and apparatus capable of acting as a consistency regulator for aqueous suspensions or slurries in paper making operations.

Still another object of the invention is to provide an improved method and apparatus for measuring consistencies of suspensions used in pulping and paper-making over a relatively wide range of values as compared with known methods and apparatus.

Other objects of the invention will become apparent to those skilled in the art from the following description, taken in connection with the accompanying drawing in which apparatus constructed in accordance with the invention is illustrated.

Very generally, in performing the method of the invention for determining the weight of a moisture-free, compressible material in a given volume of fluid suspension, the given volume of fluid suspension is first confined within a chamber. The solids therein are compressed with a porous surface or piston at a predetermined pressure to form a mat of the material. The thickness of the mat thus formed is measured and the weight of the material determined therefrom. The chamber may then be flushed by lowering a non-porous piston at the bottom thereof to open a port and by introducing fluid to flush the material out of the port.

As previously mentioned, consistency as used in the pulp and paper industry is the weight of dry fiber per unit volume of aqueous suspension or slurry. A physical property of pulp fibers, often referred to as the compressibility, may be derived from values in the following formula:

$\log C = \log m + n \log P$; or,
$C = mP^n$ where,
$C$ = the mass of dry fiber in a web compressed mat;
$P$ = the compressing pressure; and
$m$ and $n$ = experimental constants.

In the paper making art, a manual technique is often used for measuring compressibility. The value thus determined for compressibility is then used in order to perform calculations of specific surface area and specific volume of paper making fibers. Apparatus for accomplishing this manual technique includes a cylinder or chamber which is filled with slurry. A piston is then inserted into the chamber and is lowered to form the fibers in the slurry into a loose mat, the piston being porous to permit the liquid to pass therethrough. A series of readings are then taken of the distance which the mat is compressed under known pressure in given time periods. Subsequently, the mat of fibers is removed and dried and then weighted. From the data gathered, that is, the known pressure, the pad thickness after each period of time, and the final dried mat weight, the solids concentration of the mat may be determined as a function of the compacting pressure in accordance with the equation:

$C_p = W/AL$; where,
$C_p$ = the solids at pressure $P$ in weight per volume;
$W$ = dried pad weight;
$A$ = empirical constant; and,
$L$ = measured pad thickness.

The foregoing procedure, although capable of determining the compressibility of a liquid suspension or slurry, is not of much practical value where it is desired to obtain a quick determination of consistency during processing. Rather, the procedure is principally of value as a tool for laboratory investigation of certain pulp properties. It is unsuited to on-line production analysis of liquid suspensions due to the length of time required to perform the procedure. In fact, the amount of fiber used is measured subsequent to the test, by removing the mat from the apparatus, drying it, and weighing it.

The present invention makes use of the fact that the weight of dry fiber in a compressed, water-saturated pad or mat at constant compressing pressure and constant cross sectional area is a direct linear function of the mat or pad thickness. A relationship of pad weight to pad thickness may be seen from the previously set forth equation $C_p = W/AL$ which can be arranged in the form $W = C_p AL$. The empirical constant A is a constant reflecting the geometry of the particular system in which the fiber pad or mat is compressed, the fiber structure and composition thereof, and certain physical and mechanical conditions under which the test is made. Since the value of $C_p$ is by definition a constant at a given pressure, the constants $A$ and $C_p$ may be combined into a new constant $K$ to yield the equation:

$$W = KL$$

Thus, the relationshio between fiber weight and pad thickness is a linear one. Experimental data has confirmed the foregoing mathematically derived relationship. Moreover, it has been experimentally determined that the above relationship between pad thickness and pad weight is fixed for temperature variations of as much as 60°C, and is has also been determined that such relationships are valid for paper pulps of greatly different character.

To summarize, it has been demonstrated mathematically and experimentally that, over a wide range of conditions related to sample size, temperature, sample character, pad diameter, and compressing pressure, the amount of dry fiber in a water-saturated compressed pad of compressible, fibrous material is a simple linear function of the pad thickness at a fixed compressing pressure. The apparatus of the invention is operated on the basis of such relationships to determined the weight of a moisture-free compressible material by producing a pad or mat from a suspension of such material under certain known conditions. By the term "moisture-free," it is meant the equivalent weight obtained by drying to constant weight at 105°C.

In particular, the method of the invention is carried out by first confining a given volume of fluid suspension in a suitable chamber or cylinder. The material in the confined fluid suspension is then compressed with a porous surface, such as a porous piston, to form a mat of the material. The force on the piston is regulated so that the pressure at which the material is compressed is known. This may be done by attaching a suitable known weight to the piston.

After the material is compressed and formed into a mat, the thickness of the mat or pad thus formed is measured. From relationships between the pad thickness and the weight of the material, which are readily determined empirically before-hand, the weight of the material for a given pad thickness may be determined. Moreover, as will be explained subsequently, the instruments used to perform the method may be suitably calibrated to provide a direct reading of pad weight.

The method of the invention will be more clearly understood after a description of the apparatus of the invention illustrated in the accompanying drawing. The apparatus includes a supportive base 11 having an opening 12 therein. A block 13 of a corrosion resistant material, such as polysulfone, is supported by the base and has a locating projection 14 on its underside which mates in the opening 12 in the base for locating and positioning the block 13. A pneumatic cylinder 16 having an upper flange 17 is suitably secured to the projection 14 on the block 13 at the flange 17, with the flange mating within the opening 12 in the base 11.

The block 13 is provided with a lower piston passage 18 in which a solid piston 19 is capable of vertical movement. An annular seal 21 surrounds the periphery of the piston 19 and seals the region between the piston and the wall of the passage 18. The piston 19 is moved up and down vertically by a piston rod 22 which extends from the pneumatic actuator 16 through a suitable opening in the block 13 and which is moved by the actuator 16.

In the drawing, the piston 19 is shown in its lower or retracted position. In this position, the top surface of the piston 19 is below the level of a pair of passages 23 and 24 provided in the block 13. The passages 23 and 24 are horizontal passages communicating with the passage 18 from appropriate connections described subsequently. The passage 23, as will be explained, serves as an inlet passage for both flush water and slurry, whereas the passage 24 serves as an outlet passage for the aforesaid fluids.

The upper end of the piston passage 18 is provided with an annular enlarged region 26 in which the lower end of a hollow cylinder 27 is accommodated. An annular seal 28 surrounds the lower end of the cylinder 27 between the outer wall of the cylinder and the inner wall of the block 13 to form a seal therewith. Thus, the hollow interior of the cylinder 27 forms a chamber 29 communicating with the piston passage 18 and the inlet and outlet passages 23 and 24. The piston 19 is movable from the illustrated position to a position wherein the piston at least partially extends within the cylinder 27 and seals the bottom end of the cylinder to seal the chamber 29. Preferably, the piston 19 is a solid plug of polysulfone plastic and the piston rod 22 is of solid stainless steel. To provide a liquid-tight seal between the piston rod 22 and the block 13, a suitable annular seal, not illustrated, may be provided. The function of the piston 19 when in its upper position or unretracted position is to provide a solid base or reference point from which the distance between the upper surface of the piston and the upper surface of the pad being compressed is measured. The piston also serves to support the pad and to contain the slurry in the chamber 29. The tube 27 is preferably comprised of pyrex or an equivalent material.

The upper piston 31 is provided within the chamber 29 and is movable axially within the chamber. The upper piston 31 includes a plurality of holes 32 bored therein parallel with the axis thereof to allow liquid to pass from the region below the piston to the region above the piston as the piston moves downwardly in the chamber 29. Preferably, the upper piston 31 is comprised of polysulfone plastic and preferably the lower face thereof is faced with a disc of 80-mesh stainless steel woven screen (not shown).

In order to move the piston 31 vertically within the chamber 29, the piston is attached to a hollow piston rod 33 that has a pair of holes 34 drilled through its wall at diametrically opposed positions just above the piston 31. The piston rod 33 passes upwardly through a plug 36 secured to and sealed on the upper end of the cylinder 27. The piston rod 33 is suitably sealed in a central bore in the plug 36. The plug 36 is provided with an annular flange 37 by which it is secured to the underside of a support disc 38. The support disc 38 is provided with a central opening 39 therein which is substantially larger in diameter than the outer diameter of the piston rod 33. The central portion of the disc 38 through which the opening 39 is provided is raised in the form of a boss 41. A plurality of tie rods 42 extend upwardly from the block 13 to the periphery of the disc 38 and serve to secure and stabilize the disc as well as to secure the plug 36 at the upper end of the cylinder 27. A level sensing probe 43 extends downward through the plug 36 within the opening 39. The level sensing probe is connected to a suitable electrical device, as will be explained below, in order to sense the level of slurry within the chamber 29.

The upper end of the piston rod 33 terminates in and is attached to an assembly 44 and, in particular, to a downwardly extending nipple 46 thereof. A tube 47 extends transversely of the nipple 46 and communicates with the hollow interior of the piston 33 therein. The upper surface of the disc 44 carries a weight 48 selected to provide a desired amount of pressure in the compressed material in the chamber 29.

In order to raise the piston 31, a pneumatic stroke cylinder 61 is provided. The stroke cylinder 61 is supported at its lower end by a plate 62 which, in turn, is supported on and movable by the actuator rod of a pneumatic gauge cylinder 63. The gauge cylinder 63 is supported on a horizontal plate or bracket 64 which extends outwardly at the upper end of a support rod 66. The support rod 66 is mounted on the base 11 and extends vertically upward therefrom adjacent the cylinder 51. The rod 66 continues vertically upward through a slide bearing 67 on the plate 62 which maintains the plate 62 in a horizontal position but which enables vertical displacement of the plate with respect to the base 11. Two other guide rods identical with the rod 66 are provided extending upwardly from the base 11 parallel with each other and spaced at 120° intervals around the axis of the cylinder 27. A disc 71 is slidably supported in a horizontal position on the rods 66 by slide bearings 72. The piston of the stroke cylinder 61 is attached to the disc 71 and is capable of moving the disc vertically in the rods 66 in response to actuation of the cylinder 61. A pair of vertical rods 73 extend downwardly from the plate 71 parallel with the rods 66. The rods 73 pass through openings 74 in the plate 44 and terminate in stops 76 provided at the lower ends of the rods 73.

When the cylinder 61 is actuated to raise the disc 71, the disc moves upwardly in its horizontal position on the rods 66. The rods 73 move upwardly with the disc 71 until the stops 76 engage the underside of the disc 44. When this occurs, the disc 44 is supported by the stops 76 and is raised therewith. This moves the piston rod 33 vertically upwardly and consequently effects a movement of the piston 31 within the chamber 29. Similarly, when the stroke cylinder 61 is retracted, the disc 71 moves downwardly, moving the rods 73 downwardly and thus lowering the disc 44. Since the disc 44 is not secured to the stops 76, the piston 31 is allowed to move downwardly in the chamber 29 under the force of the weight 48.

The gauge cylinder 63 permits variation in the operation of the apparatus at retracted and extended positions of the stroke cylinder 61. For example, if it is desired to recycle the apparatus without flushing the pad, a signal from the operator or a programmed controller (described below) to the gauge cylinder causes the latter to extend. This raises the upper piston 31 off the pad slightly. By reciprocating the stroke cylinder 61 when the gauge cylinder is in such a position, the upper piston 31 acts as a stirrer, recirculating the fibers into suspension without compressing them.

In order to provide for automated operation of the apparatus thus far described, a valve 81 connects the tube 47 to a vacuum system, not shown, thus enabling withdrawal of the contents of the chamber 29 above the piston 31 through the hollow piston rod 33 and the tube 47. In addition, a valve 82 is connected between the tube 47 and a pressurized water system, not shown, enabling the flushing of the hollow piston rod 33 and of the region of the chamber 29 above the piston 31.

A valve 83 is coupled to the inlet passage 23 and operates a source of pressurized water (not shown) for flushing the passage 23 and the portion of the chamber 29 below the piston 31. Also connected to the inlet passage 23 is a valve 84 which operates between the inlet passage and a source of slurry or suspension to be analyzed. Preferably, the valve 84 connects a constant head reservoir to the inlet passage 23 for providing slurry for the chamber 29. A valve 86 is connected to the outlet passage 24 and may be closed when it is desired to pass slurry into the chamber 29. When the chamber is to be flushed, the valve 86 is opened, the valve 84 is closed, and the valves 82 and 83 are opened.

In order to automatically operate the valves 81, 82, 83, 84 and 86, and in order to automatically operate the cylinders 61, 63 and 16, a control system 87 is provided. The control system may be of any suitable construction for properly programming the operation of the various automated elements. For example, a stepping drum programmer may be provided with appropriate timers, relays, counters, and electrical and pneumatic switches.

In order to provide an indication of the position of the face of the upper piston 31, the disc 44 is attached to the lower end of the core 88 of a linear position transducer 89. The transducer may be of any suitable construction and in the illustrated embodiment provides a direct current output proportional to the position of the piston 31. One type of transducer which is satisfactory for this purpose is available from Schaevitz Engineering Co., Pennsauken, N.J., and consists of three coils wound equally spaced on a cylindrical form. When alternating current is applied to the center coil, voltages are induced across the other two coils. A rod-shaped magnetic core moves axially within the coil assembly, providing a low reluctance path for magnetic flux linking the two outer coils. With the end coils connected in series opposed, and with the core centered, the combined output of the end coils is zero. When the core is displaced from its centered position, the net output increases proportionally.

The output of the transducer 89 is applied to a recorder 91. The recorder 91 is optional and is merely provided for the purposes of recording the particular consistency values over a given period of time, such as on a moving chart. Naturally, the output signal derived by the transducer 89 may be fed back to suitable relays, servo mechanisms, gauges, etc., depending upon a particular control response desired.

In order to operate the apparatus in accordance with the invention, the control system operates the lower piston 19 to the retracted position as shown in the drawing. The upper piston 31 is then raised to just below the level of the sensing probe 43. The outlet valve 86 is closed, the water valves 82 and 83 are closed, the vacuum valve 81 is closed, and the slurry valve 84 is open. Slurry then flows from the constant head reservoir, not shown, into the apparatus through the inlet passage 23 to fill the cylinder 27. When the slurry level reaches the sensing probe 43, an electrical signal causes the valve 84 to close. A further electrical signal at the same time causes the pneumatic device 16 to move the lower piston 19 up into the tube 27, sealing the bottom of the tube. The sensing probe is set to allow the liquid level to rise the necessary amount when the piston 19 is raised into position without overflowing. (The liquid passes through the upper piston 31 and the fibers are retained below it.) The apparatus is now ready for the compressing operation.

In order to compress the material in the slurry or suspension and form a pad or mat, the stroke cylinder 61 is actuated to return to its retracted position. The rate of return is such that the piston 31 is prevented from falling freely, that is, that the piston 31 is lowered at a rate which is substantially slower than the rate at which it would lower solely in response to the action of gravity on the weight 48 coupled with the resistance of the fluid within the chamber 29. When the stroke cylinder 61 is in its fully retracted position, the upper piston 31 rests freely upon a pad of fibers strained from the slurry by the downward movement of the porous piston. The pad is supported by the lower piston 19.

When the stroke cylinder 61 reaches its retracted position, an electrical signal actuates a suitable time delay relay in the control system 81, preferably set for about three minutes. This allows the pad to reach a constant rate of compression before measuring its thickness. At the end of this time delay period, the transducer 89 is activated. After a time delay sufficient to enable the transducer output voltage to stabilize, typically about 5 seconds, the recorder 91 is actuated and responds to the transducer dc voltage output to record the signal level. This signal level is proportional to the distance between the faces of the upper and lower pistons, thus measuring the thickness of the pad of compressed fibers. The thickness is, of course, proportional to the dry fiber content of the pad.

The apparatus may be suitably calibrated to read out a direct value of dry fiber content or consistency. Calibration may be accomplished by taking a series of voltage measurements for a series of selected volumes of slurry and subsequently weighing the fiber pads after drying. The fiber pads are obtained by flushing from the apparatus, and are dried by straining the flushing liquid through suitable filter paper and drying at a temperature of 105°C. The procedure thereby yields a series of readings for pad weight versus pad thickness.

After the compressing and recording operation is complete, the apparatus is placed in a condition to begin another cycle. To accomplish this, the recorder 91 is turned off after the recording period and returns to an appropriate position for the next record. The outlet valve 86 is open and the lower pneumatic cylinder 16 is operated to retract the piston 19 to the illustrated position. This allows the upper piston 31 to move downwardly in the chamber 29 until the stops 76 engage the underside of the plate 44. The apparatus is adjusted, through the gauge cylinder 63, such that the lower surface of the upper piston 31 is in the stop position flush with the upper edges of the passages 23 and 24. The water valve 83 is then opened and water flushes through the passages 23 and 24, removing the compressed pad and water from the chamber 27 through the valve 86 to a suitable waste disposal system. During this flushing period, which may last, for example, 2 minutes, the vacuum valve 81 is periodically opened to withdraw liquid and any suspended fibers from above the upper piston. Upon completion of the flushing period, the water valve 83 is closed, the outlet valve 86 is closed, the stroke cylinder 61 raises the upper piston 33 to the starting position just below the level of the sensing probe, and the sequence of operations is repeated.

The invention has application as a consistency measuring device and, if provided with an appropriate control function, such as the opening or closing of a valve in a water feed line to a reservoir or tank, the invention can further act as a consistency regulator. A distinct advantage of this device in measuring consistency over other devices is that the range of consistency values that the device is capable of measuring is limited on the high side only by that which can be handled and transported as a fluid, and on the low side by practical limitations in size of the compressing chamber to handle a sufficient volume of slurry that will contain enough fiber to form a compressible pad. Thus, the device is applicable to the full range of consistencies encountered in pulping and papermaking, normally from about 0.2 to 6.0 percent consistency. Other devices cover only narrow portions of this range.

An additional advantage of the present invention is that it makes possible the measuring of a sample of solid compressible material in a liquid suspension in order to obtain a desired amount of solid for automated chemical testing. The measurement is accomplished accurately by the relationship established between the weight of the compressed pad and the pad thickness at a fixed compressing pressure. The approximately desired amount may be readily obtained by selecting an appropriate volume of slurry for entry into the device. By withdrawing the water from the compressed pad by means of the hollow upper piston rod through the vacuum valve 81, the sample may be obtained in a form usable for testing.

By appropriately selecting the materials of construction of the device, and by the provision of means for maintaining the temperature of the slurry at a fixed temperature, many forms of chemical testing may be performed in the device itself. The hollow upper piston rod may be utilized for the introduction and removal of reagents and solutions to and from the compression chamber and, where required, the upper piston may be used as an agitator by programming the stroke or the gauge cylinders to move the piston up and down at a required rate and for a required stroke length. Examples of chemical tests which may be performed on pulp samples contained within the apparatus of the invention are the Kappa number or permanganate number test, and the viscosity after dissolution of the sample in the device. Such tests are well known to those skilled in the paper making art.

It may therefore be seen that the invention provides an improved method and apparatus for determining the weight of a moisture-free, compressible material in a given volume of fluid suspension. The method and apparatus of the invention readily lend themselves to automation and provide a simple and reliable means for on-line analysis of suspensions in process, such as may be extremely useful in the art of paper making.

Various modifications of the invention in addition to those shown and described herein will become apparent to those skilled in the art from the foregoing discussion and accompanying drawing. Such modifications are intended to fall within the scope of the appendant claims.

What is claimed is:

1. A method for determining the weight of a moisture-free, compressible material in a given volume of fluid suspension, comprising, confining the volume of the fluid suspension, compressing the material in the confined fluid suspension with a porous surface at a predetermined pressure to form a mat of the material, measuring the thickness of the mat thus formed after a predetermined first time interval after compressing the material, said thickness being measured over a predetermined second-time interval, and determining the weight of the material from a known relationship thereof to the mat thickness.

* * * * *